United States Patent [19]

Tschöp

[11] Patent Number: 5,678,603
[45] Date of Patent: Oct. 21, 1997

[54] PLATE VALVE, PARTICULARLY FOR PISTON COMPRESSORS

[75] Inventor: Kurt Tschöp, Vienna, Austria

[73] Assignee: Hoerbiger Ventilwerke Aktiengesellschaft, Vienna, Austria

[21] Appl. No.: 499,494

[22] Filed: Jul. 7, 1995

[30] Foreign Application Priority Data

Jul. 15, 1994 [AT] Austria ................. 1395/94

[51] Int. Cl.[6] ............................................. F16K 15/00
[52] U.S. Cl. ...................... 137/512.1; 137/516.17; 137/516.19
[58] Field of Search ............... 137/512, 512.1, 137/516.17, 516.13, 516.19, 516.21, 516.23

[56] References Cited

U.S. PATENT DOCUMENTS

| | | |
|---|---|---|
| 1,287,751 | 12/1918 | Richards ................. 137/512.1 |
| 1,890,051 | 12/1932 | Gehres . | |
| 3,536,094 | 10/1970 | Manley . | |
| 4,307,751 | 12/1981 | Mayer ................... 137/512.1 |
| 4,483,363 | 11/1984 | Madoche ............... 137/512.1 |
| 4,526,195 | 7/1985 | Humphrey ............. 137/512.1 |
| 4,924,906 | 5/1990 | Hrabal .................. 137/512.1 |
| 5,052,434 | 10/1991 | Bauer .................... 137/512.1 |
| 5,100,606 | 3/1992 | Woollatt . | |

*Primary Examiner*—Denise L. Ferensic
*Assistant Examiner*—Ramyar Farid
*Attorney, Agent, or Firm*—Watson Cole Stevens Davis, P.L.L.C.

[57] ABSTRACT

A plurality of concentric annular plates (1) are braced against a valve guard (2) by means of radially arranged spring-loaded bridges (5). The guided height (6) of the bridges (5) is at least equal to the maximum lifting height (7) of the annular plates (1) which abut against centering elements (8) of the bridges (5) and are guided by means of the bridges (5) relative to the valve guard (2) along the entire lift. A very simple guiding of the annular plates (1), which preferably impact against the valve guard (2) only via the bridges (5) and thus show a reduced tendency to sticking, is achieved particularly by constructing the annular plates (1) and/or bridges (5) from fiber-inforced plastic material.

8 Claims, 2 Drawing Sheets

PLATE VALVE, PARTICULARLY FOR PISTON COMPRESSORS

BACKGROUND OF THE INVENTION

1. Field of the Invention

The invention concerns a plate valve, particularly for piston compressors, with a plurality of separate concentric annular plates that are braced against the valve guard by spring-loaded which bridges overlap at least a portion of the annular plates, are essentially radially arranged, and are guided in the lifting direction in a recess of the valve guard.

2. The Prior Art

A plate valve of this type is known, for example, from U.S. Pat. No. 1,890,051, wherein in that case the bridges are constructed as wires having a circular cross-section which are guided in corresponding bores in the valve guard by means of their perpendicularly upward bent ends. This will result in difficulties especially when the individual annular plates are lifted to different heights, in which case the inclined positioned bridge jams easily in the valve guard, resulting in the valve never closing correctly again. To avoid these difficulties, in a construction of the type mentioned in the introduction known for example from Austrian patent 22,804, the bridges are made of simple sheet metal strips having a rectangular cross-section, which makes a problem-free skewing of the bridges possible when the annular plates open unevenly.

The guiding of the annular plates in their direction of movement is carried out in the case of both constructions described in turned recesses of the valve guard, which has to be machined additionally to guide the bridges and the annular plates. A further disadvantage for both constructions is that the annular plates, when impacting, the valve guards at the end of their lift, are inclined to stick slightly, leading to uncontrollable closing delays.

The object of this invention is to improve a plate valve of the type mentioned in the introduction wherein the disadvantages mentioned of the known constructions will be avoided and that an improvement of the design will be achieved particularly by simple and reliable means by lowering the manufacturing costs and the tendency to stick by the annular plates.

SUMMARY OF THE INVENTION

This object is achieved according to the invention in case of a plate valve of the type mentioned in the introduction by that the guided height of the bridges is greater than/equal to the maximum lifting height of the annular plates and that the annular plates abut against centering elements of the bridges and are guided by means of the bridges relative to the valve guard, along the entire lift. Thus the centering and guiding of the annular plates is carried out practically exclusively by means of the bridges, which due to their corresponding height are guided along the entire lifting in the associated recesses of the valve guard. In this manner the problems addressed in the introduction regarding miscellaneous skewings of the bridges when the annular plates open unevenly can be prevented very reliably on the one hand and additional machinings of the valve guard for the guiding of the annular plates becomes completely superfluous on the other, so that a very reliable, simple and cost-effective design will result.

The stopping of the annular plates at the end of their opening lift can be distributed either between the bridges and the surface areas of the valve guard lying between them in a wide range in any manner, or otherwise, according to a preferred development of the invention, according to which in the open state of the plate valve the annular plates are braced against the valve guard via the bridges and have at least a partial gap relative to the valve guard, can be assigned practically exclusively to the bridges, thereby counteracting very reliably the jamming of the valve plate due to the very small impact areas in this case.

A further development of the invention provides that the bridges on that side which face the valve guard have pot-shaped recesses to support individual helical springs. In this manner a reliable support of the valve springs is assured, and also improves the guiding of the bridges in the recesses of the valve guard.

According to another development of the invention the bridges on that side which face the valve guard may also have a common recess extending in the longitudinal direction of the bridge for the purpose of supporting a plurality of helical compression springs positioned at a distance from each other. This will facilitate not only the manufacture of the bridges but will make it also possible to use them in different plate valves with, if necessary, different distances between the springs, or in case of asymmetrically arranged individual springs to prevent or at least limit the wearing in of the ends of the springs by occasionally reversing the bridges.

According to another preferred construction of the invention the bridges can be supported by wavy spring elements or the like extending in the longitudinal direction of the bridge in the recesses of the valve guard serving for their guiding, while in the case of this construction, just like in case of the above discussed individual coil springs, the spring loading may be asymmetrical or distributed unevenly along the length of the bridges. In this manner a targeted pre-determined sequence can be aimed for and achieved for the opening of the annular plates, so that when small quantities are conveyed or the intake or discharge flow rate is small only individual annular plates would open while the others remain closed fully or partially, consequently reducing their wear.

A preferred further development of the invention provides that in the operation of the plate valve the recesses for the guiding of the bridges in the valve guard are closed around by the bridges with the exception of a guiding clearance, which, in addition to the improved guiding properties, also has the advantage that broken springs or their parts cannot reach at all or only with difficulty the compressor or the like via the plate valve.

Bridges and annular plates may be manufactured from all conventional materials or combination of materials known in this conjunction; however, according to a development of the invention, it is particularly preferred to make these from plastic material, particularly fibre-reinforced plastic material, and to manufacture preferably at least the bridge by injection moulding process. In this manner excellent sealing and attenuation properties are achieved on the one hand and very low masses on the other, further improving the operation of the valve. Thus the manufacture of the bridges and annular plates is very simple and cost effective, in particular with regard that correspondingly constructed and/or dimensioned bridges and/or annular plates can be used in various arrangements for a number of differently dimensioned plate valves.

BRIEF DESCRIPTION OF THE DRAWINGS

The invention will be explained in detail with respect to a plate valve which is partially schematically illustrated in the drawings wherein.

DETAILED DESCRIPTION OF THE PREFERRED EMBODIMENT

Figure 1:
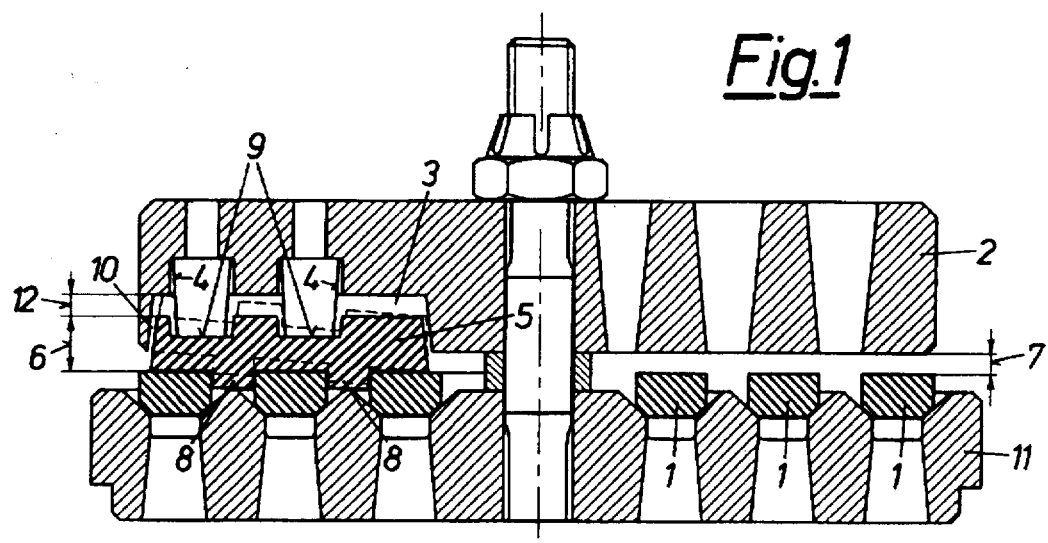
FIG. 1 is a cross-section of a plate valve as seen along line of FIG. 2.
Figure 2:
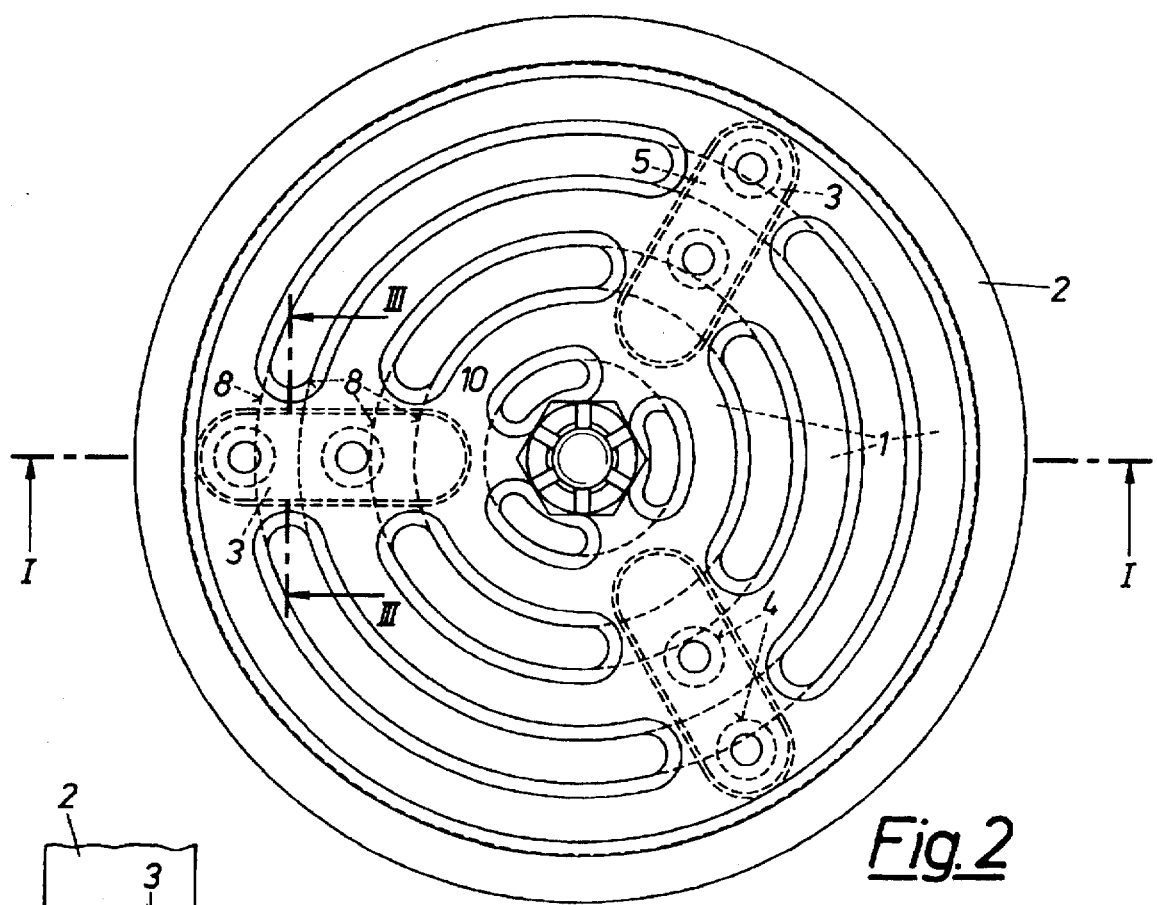
FIG. 2 is a top view of the valve according to FIG. 1.
Figure 3:
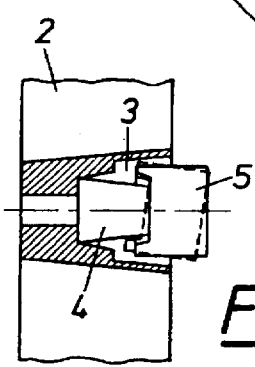
FIG. 3 is a partial section along the line III—III in FIG. 2.

The plate valve illustrated in FIGS. 1–3 is used, for example, as an outlet valve of a piston compressor, and it has a plurality of separate concentric annular plates 1 which are braced against the valve guard 2 by bridges 5 having individual valve springs 4, which bridges in this case overlap all three annular plates, are radially arranged and are guided in recesses 3 of the valve guard 2. The guided height 6 of the bridges is greater than/equal to the maximum lifting height 7 of the annular plates 1, so that the guiding of the annular plates 1 during the entire lift is carried out only via the bridges 5, onto which pressure is exerted from above by means of the valve springs 4 and the recesses 3 in interaction with the bridges 5.

The underside of the valve guard 2 is flat and has no guide grooves or the like for the annular plates 1. The annular plates 1, in turn, abut against the centering elements 8 of the bridges 5, which are constructed here by groove-like recesses, so that they cannot be displaced at least in the radial direction.

Figure 4:
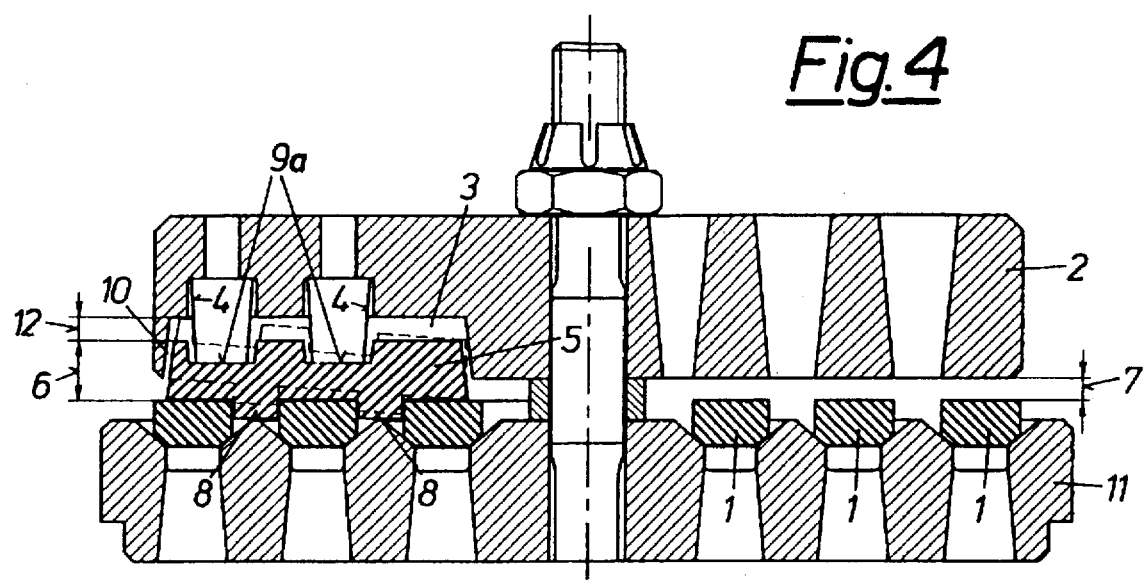
FIG. 4 shows a cross-section of an alternative plate valve to that shown in FIG. 1 wherein the bridge provides a single common recess facing the valve guard.

On the side which faces the valve guard 2 the bridges 5 have pot-shaped recesses 9 to support the valve springs 4 which are constructed as individual helical springs. However, in contrast to this, as shown in FIG. 4 a single common recess 4 extending in the longitudinal direction of the bridge 5 to support several springs at a distance from each other is possible.

The spring-loading by the valve springs 4 is in this case asymmetrical or unevenly distributed over the length of the bridge 5, resulting in the operation of the plate valve wherein the innermost annular plate 1 will lift earlier, which may open as the only one at a low flow rate, thus protecting the outer annular plates 1.

In the operation of the plate valve the recesses 3 for the guiding of the bridges 5 in the valve guard 2 are closed around by the bridges 5 with the exception of a guiding clearance 10, so that parts of broken springs 4, should this happen, cannot reach at all or only with difficulty the compressor equipped with a plate valve of this type.

In the embodiment illustrated both the bridges 5 and the annular plates 1 are manufactured of plastic material, preferably of fibre-reinforced plastic material. The manufacture by injection-moulding is particularly recommended for the bridges, resulting in an accurate and cost-effective manufacture.

In the open state the annular plates 1 are braced against the valve guard 2 exclusively via the bridges 5, as the gap defining the maximum lifting height 7 between the upper side of the annular plates 1 abutting against the valve seat 11 and the underside of the guard 2 is greater than the distance 12 between the top side of the bridges 5 and the bottom of the recess 3 in the valve guard 2, counteracting the sticking of the annular plates 1 in the valve guard 2. So long as the dimensions are selected in relationship with each other, it can be assured, if required, that the annular plates 1 will not contact the valve guard 2 even in the case the bridges 5 open unevenly and consequently are in a skewed position. However, for some applications a distribution of the impact against the bridges 5 on the one hand and the annular plates 1 themselves on the other may be appropriate.

Particularly FIG. 2 makes it clear, that the bridges 5 may be constructed so that they are smaller than the radial expansion of the plate valve and will overlap only a part of the respective number of annular plates. Thus, for example, in the version illustrated the bridges 5 could overlap only two of the three annular plates 1 and to do this with an appropriate number alternating around for the inner and outer annular plates. Furthermore, as an example in the illustrated version, further single bridges overlapping only the two outer annular plates may be provided between the three bridges 5 which are common for all annular plates, what would allow a further influencing of the individual spring loading of the individual annular plates 1.

I claim:

1. A plate valve for piston compressors, which includes a valve guard defining a plurality of first recesses, a plurality of separate concentric annular plate (1), a plurality of elongated one-piece bridges positioned between said valve guard and said annular plates, each said elongated bridge defining at least one second recess facing said valve guard, at least one spring means extending into the second recess of each bridge to extend between said bridge and said valve guard, each elongated bridge being radially oriented and extending over at least a portion of at least two of said concentric rings so as to contact at least two of said concentric rings, said bridges, when lifted away from said annular plates, being guided into the first recesses of said valve guard to enclose said first recesses except for a guiding clearance, wherein a guided height (6) of the bridges (5) is at least equal to a maximum lifting height (7) of the annular plates (1) to accommodate uneven lifting movement of said annular plates, wherein said bridges include centering elements which abut said annular plates (1), and wherein said bridges guide said annular plates relative to said valve guard (2) along the entire lift.

2. A plate valve according to claim 1, wherein at least one of said bridges includes a plurality of second recesses which are each pot shaped to support individual helical springs (4).

3. A plate valve according to claim 1, wherein at least one bridge includes one common second recess which extends in a longitudinal direction of a said at least one bridge for supporting a plurality of helical compression springs (4) positioned at a distance from each other.

4. A plate view according to claim 1, wherein said spring means are wavy spring elements.

5. A plate view according to claim 1, wherein the spring means are arranged asymmetrically along a length of the bridges.

6. A plate valve according to claim 1, wherein the bridges (5) and annular plates (1) are manufactured from plastic material.

7. A plate valve according to claim 1, wherein the annular plates (1) in the an open state of the plate valve are braced via the bridges (5) and have at least a partial gap relative to the valve guard (2).

8. A plate valve according to claim 6, wherein said plastic material contains reinforcing fibers.

* * * * *